Oct. 2, 1923.   1,469,258
A. G. GEISTERT
CLUTCH AND BRAKE LEVER SUPPORTING BRACKET
Filed April 3, 1920
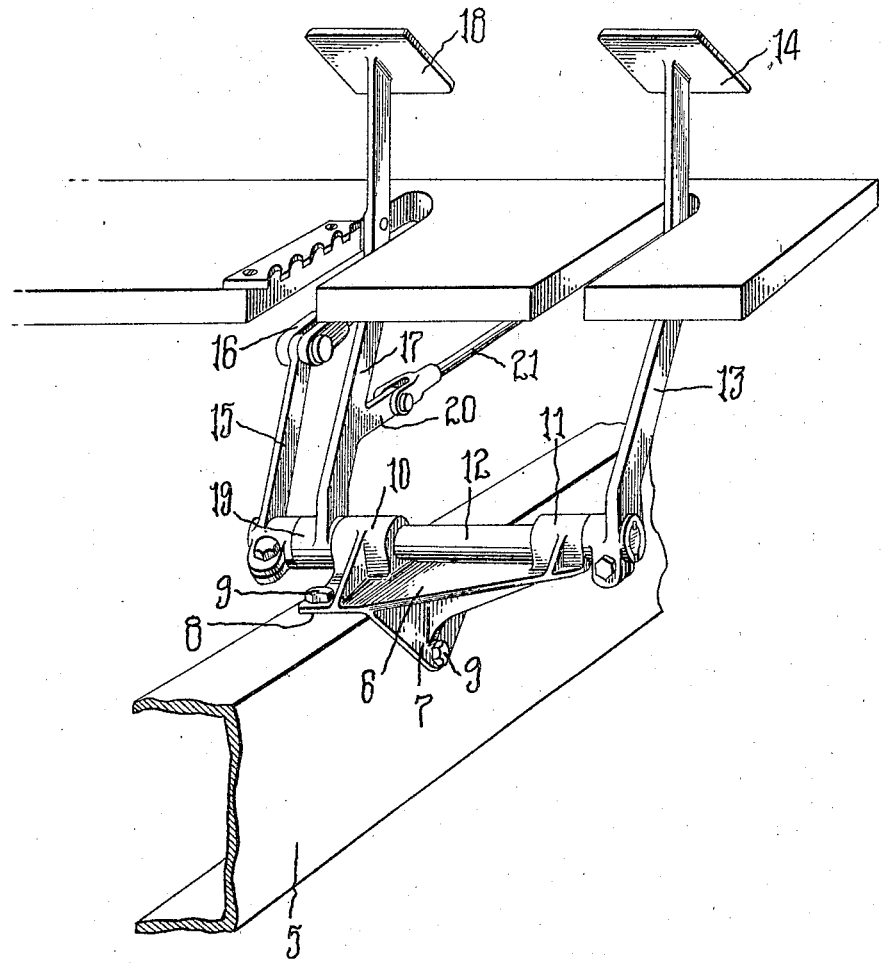
Inventor
Albert G. Geistert
By Attorneys Patented Oct. 2, 1923.

1,469,253

UNITED STATES PATENT OFFICE.

ALBERT G. GEISTERT, OF NEW YORK, N. Y., ASSIGNOR TO GENERAL MOTORS CORPORATION, OF DETROIT, MICHIGAN, A CORPORATION OF DELAWARE.

CLUTCH AND BRAKE LEVER SUPPORTING BRACKET.

Application filed April 3, 1920. Serial No. 371,123.

*To all whom it may concern:*

Be it known that I, ALBERT G. GEISTERT, a citizen of the United States, and a resident of New York, county of New York, and State of New York, have invented certain new and useful Improvements in Clutch and Brake Lever Supporting Brackets, of which the following is a full, clear, concise, and exact description, such as will enable others skilled in the art to which the invention relates to make and use the same, reference being made therein to the accompanying drawings, which form a part of this specification.

My invention relates to automobiles and similar self-propelled vehicles, and particularly to an improved foot operated lever mechanism for controlling the clutch through which the driving engine is disconnected from the driving shaft of the vehicle, and for operating the brakes of the vehicle.

The principal object of my invention is to provide an improved foot operated lever mechanism for controlling the clutch and the brake of the vehicle in which the entire mechanism will be supported by a single bracket secured at one point to a side frame member of the vehicle, to thereby avoid the use of transversely extending shafts associated with the brake and clutch mechanisms and supported from the two side members of the frame of the vehicle, or from a crossbar extending between said side members, as has heretofore commonly been the case; the entire lever mechanism for operating the brake and clutch mechanisms being supported by a single bracket, which in turn is secured to and supported by one of the side frame members of the vehicle frame in the combined brake and clutch operating mechanism wherein my invention consists.

My invention is illustrated in its preferred form in the drawing accompanying and forming a part of this specification altho the same may be variously modified without departing from the scope of my invention, so long as such alleged modifications come within the scope of the concluding claims wherein the distinguishing features in which my invention consists are particularly pointed out.

Referring to the drawing, Figure 1 is a fragmentary perspective view illustrating my invention and the manner in which the same is supported from one of the side frame members of the vehicle frame.

Referring to the drawing, the reference numeral 5 designates one of the two longitudinally extending side members of the frame of the vehicle, the other member and various other parts of the vehicle not being shown as my invention is in no way concerned with the elements of the vehicle other than such as are illustrated in the drawing.

The reference numeral 6 designates a supporting bracket the same having a depending flange 7 and a laterally extending portion 8 which fit, respectively, along the side web of the frame member and across the top web thereof; and fastening bolts 9 extend through these flange portions and serve to fasten the bracket as a whole securely to the side frame member 5 of the vehicle frame; the said securing means being, as it will be observed, located at one end of the bracket 6 so that the greater part of the bracket extends to one side of the vertical plane of the side frame member.

Located upon the upper side of the bracket 6 and spaced apart from one another are two bearings 10, 11 which bearings are therefore located above the plane of the upper edge of the side frame member 5; and the reference numeral 12 designates an oscillating shaft supported in the bearings aforesaid and extending across the upper end of the frame member.

Secured to one end of the oscillating shaft 12 is an upwardly extending foot operated lever or pedal 13 having a plate 14 at its upper end to be engaged by the foot of the operator, while the reference numeral 15 designates an upwardly extending arm secured to the other end of the oscillating shaft 12 so as to move therewith and with the lever 13, and the upper end of which arm is operatively connected with an operating rod 16. The reference numeral 17 designates a second foot operated lever extending upwardly from the shaft 12 and having a plate 18 at its upper end to be engaged by the foot of the operator, and the lower end of which lever is provided with a bearing 19 which surrounds the shaft 12 and through which the said shaft extends to thereby loosely support the said last mentioned lever upon said shaft; said bearing being located between the inner bearing 10 of the bracket 6 and the upwardly extending arm 15. This second mentioned lever is provided with means intermediate its ends shown as comprising a lug 20 whereby the said second mentioned lever may be operatively connected with a second operating rod 21, the rods 16 and 21 being operatively connected one with the brake mechanism of the vehicle and the other with the clutch thereof as will be appreciated.

In view of the premises it will be appreciated that the levers concerned with the operation of the brake and clutch mechanism of the vehicle, as well as the shaft whereby said levers are supported, are all supported by means of a single bracket secured to one of the frame members of the vehicle. This form of clutch and brake operating mechanism avoids the presence of oscillating shafts transverse to the frame members and supported by bearings carried one by one frame member and the other by the other, as has heretofore commonly been the case, or the presence of a transversely extending supporting member for supporting the brake mechanism which is a construction which has also been used; thus providing supporting means for the brake and clutch operating mechanism which is self-contained and supported entirely from one of the frame members of the vehicle. The supporting of the entire brake and clutch operating mechanism from one member only of the frame avoids strains and possible injury to said mechanism due to twisting of the frame, which has been an objection in clutch and brake operating mechanism of the kind heretofore commonly used; as it will be appreciated that no twisting of the frame as a whole can result in subjecting the clutch and brake operating mechanism in which my invention consists to strains as the bracket whereby said mechanism is supported is itself secured to one only of the side frame members of the vehicle frame.

Having thus described and explained my invention, I claim and desire to secure by Letters Patent:

1. In a motor vehicle, a frame member; a bracket having two bearings upon its upper side spaced apart from one another, and having also means upon its under side whereby the same may be secured to said frame member; an oscillating shaft supported in said bearings and extending across the upper end of said frame member; an upwardly extending foot operated lever secured to said shaft and located at one end thereof; an arm secured to the other end of said shaft and extending upwardly therefrom, and the free end of which arm is adapted to be connected with an operating rod; a second upwardly extending foot operated lever having means whereby it can be connected with a second operating rod, said second mentioned lever having a bearing at its lower end and through which said shaft extends, said bearing being located between the inner of the bearings upon said bracket and the upwardly extending arm aforesaid.

2. In a motor vehicle, a frame member; a bracket secured to said frame member and having two bearings spaced apart from one another; an oscillating shaft supported in said bearing; an operating lever secured to said shaft and located at one end thereof; an arm secured to the other end of said shaft and the free end of which arm is adapted to be connected with an operating rod; a second operating lever having a bearing through which said shaft extends and which bearing is located between one of the bearings of said bracket and the arm aforesaid, and whereby said second lever is loosely supported upon said shaft; and means whereby said second mentioned lever may be operatively connected with a second operating rod.

3. In a motor vehicle, a frame member; a bracket secured to said frame member and having two bearings upon its upper side and spaced apart from one another, and which brackets lie above said frame member; an oscillating shaft supported in said bearings and extending across said frame member; an operating lever secured to said shaft and located at one end thereof; an arm secured to the other end of said shaft and the free end of which arm is adapted to be connected with an operating rod; a second operating lever having a bearing through which said shaft extends and whereby said second lever is loosely supported upon said shaft; and means whereby said second mentioned lever may be connected with a second operating rod.

4. In a motor vehicle, a frame member; a bracket having two bearings spaced apart from one another, and means located at one end thereof for securing the same to said frame member; an oscillating shaft supported in said bearings; an operating lever secured to said shaft and located at one end thereof; an arm secured to the other end of said shaft and extending upwardly therefrom and the free end of which arm is adapted to be connected with an operating rod; and a second operating lever having a bearing through which said shaft extends and whereby said second lever is loosely supported upon said shaft, and which said second lever is adapted to be connected with a second operating rod.

5. In a motor vehicle, a frame member; a bracket secured to said frame member and having two bearings spaced apart from one another; an oscillating shaft supported in said bearing; an operating lever secured to said shaft and located at one end thereof, and having a plate at its upper end to be engaged by the foot of an operator; an arm secured to the other end of said shaft and extending upwardly therefrom, and the free end of which arm is adapted to be connected with an operating rod; and a second operating lever having a bearing through which said shaft extends and whereby said second lever is loosely supported upon said shaft, said second lever having a plate at its upper end adapted to be engaged by the foot of an operator and the same having means whereby it may be operatively connected with a second operating rod.

6. In a motor vehicle, a frame member; a bracket secured to said frame member and having two bearings spaced apart from one another; an oscillating shaft supported in said bearings; an operating lever secured to said shaft and located at one end thereof; an arm secured to the other end of said shaft and the free end of which arm is adapted to be connected with an operating rod; and a second operating lever having a bearing through which said shaft extends and whereby said second lever is loosely supported upon said shaft, and which second lever is adapted to be connected with a second operating rod.

In testimony whereof I affix my signature.

ALBERT G. GEISTERT.